United States Patent [19]

Muller et al.

[11] Patent Number: 5,211,881

[45] Date of Patent: * May 18, 1993

[54] METHODS AND COMPOSITIONS FOR TREATING METALS BY MEANS OF WATER-BORNE POLYMERIC FILMS

[75] Inventors: Frank A. Muller, West Los Angeles; Ronald F. Dubs, Yorba Linda, both of Calif.

[73] Assignee: Elf Atochem North America, Inc., Philadelphia, Pa.

[*] Notice: The portion of the term of this patent subsequent to Feb. 4, 2009 has been disclaimed.

[21] Appl. No.: 828,265

[22] Filed: Jan. 30, 1992

[51] Int. Cl.$^5$ ................................................ C09K 3/00
[52] U.S. Cl. ......................... 252/389.52; 252/387; 252/390; 106/14.14; 106/14.15; 106/14.16; 106/14.17; 427/388.4
[58] Field of Search ............... 106/14.16, 14.14, 14.15, 106/14.17; 252/387, 394, 389.52, 390; 427/388.2, 388.4

[56] References Cited

U.S. PATENT DOCUMENTS

| | | | |
|---|---|---|---|
| 3,175,921 | 3/1965 | Hedlund et al. | 427/388.2 |
| 3,297,616 | 1/1967 | Fisher, Jr. et al. | 106/14.21 |
| 4,066,398 | 1/1978 | Hwa | 106/14.13 |
| 4,317,744 | 3/1982 | Levi | 106/14.12 |
| 4,485,131 | 11/1984 | Adams et al. | 427/388.2 |
| 4,610,929 | 9/1986 | Mosser et al. | 427/421 |
| 4,656,060 | 4/1987 | Krzyzewski | 106/16 |
| 4,818,777 | 4/1989 | Braig | 252/391 |
| 4,894,091 | 1/1990 | Braig et al. | 252/391 |
| 5,085,696 | 2/1992 | Muller et al. | 106/14.16 |

FOREIGN PATENT DOCUMENTS

| | | | |
|---|---|---|---|
| 0286265 | 10/1988 | European Pat. Off. | 106/14.12 |
| 2807698 | 5/1979 | Fed. Rep. of Germany | 106/14.42 |
| 57-026175 | 2/1982 | Japan | 106/14.42 |
| 58-071968 | 4/1983 | Japan | 106/14.42 |

OTHER PUBLICATIONS

"Encyclopedia of Chemical Technology", Kirk-Othmer, vol. 9, pp. 14–17 (1952).
"Metals Handbook", 9th Edition, vol. 5, pp. 597–600 (1982).
"Preparation of Metals for Painting", Samuel Spring, pp. 94–96 and 142–158 (1965).

*Primary Examiner*—Anthony McFarlane

[57] ABSTRACT

Corrosion resistance of metals such as aluminum is promoted by contact with a formulation containing a solution of an acrylic polymer; a blocked water-soluble zirconium or zinc catalyst; a mixture of water and an organic solvent; and a corrosion additive component.

5 Claims, No Drawings

METHODS AND COMPOSITIONS FOR TREATING METALS BY MEANS OF WATER-BORNE POLYMERIC FILMS

FIELD OF THE INVENTION

This invention relates to non-chromated compositions and methods for applying protective films to the surface of metals such as aluminum or galvanized steel. More particularly, such surfaces are rendered resistant to the corrosive effects of salt-spray and the like by applying acrylic polymeric films from water-based solutions or dispersions. The compositions contain a solution o dispersion of an acrylic polymer; a water-soluble, blocked zirconium or zinc catalyst; a non-toxic organic solvent in mixture with water; and a corrosion additive component. Following application of the protective film (or coating), a "top coat" or paint is optionally applied. Aircraft aluminum panels, galvanized conduits, and many other architectural applications that encounter corrosive environments are among products dependent on pre-treatment with protective coatings prior to painting.

BACKGROUND OF THE INVENTION

Traditional methods for obtaining salt-spray resistance of unpainted metal, such as high copper-containing aluminum alloys, without affecting adhesion of the top coat include conversion coating with hexavalent chrome solutions and the applications of solvent-base wash primers that contain insoluble chromate pigments and phosphoric acid—see, for example, "Encyclopedia of Chemical Technology", Kirk-Othmer, Volume 9, pages 14-17 (1952); "Metals Handbook", 9th Edition, Volume 5, pages 597-600 (1982); "Preparation of Metals for Painting", Samuel Spring, pages 94-96 and 142-158 (1965). Increasingly stricter hazardous waste restrictions have now placed limits on the use of such toxic chromium salts. Thus, the industry is in need of alternative protective coatings which will enable the unpainted metal to withstand 168 hours salt-spray attack.

Copending application Serial No. 735,481, filed Jul. 25, 1991, discloses formulations based on aqueous emulsions of acrylic polymers, but the instant solutions or dispersions enable good corrosion resistance and paint adhesion properties to be obtained at far less cost.

SUMMARY OF THE INVENTION

A formulation is provided for coating the surface of a metal such as aluminum or galvanized steel with a protective, polymeric film. The formulation contains (a) a solution (or dispersion) of an acrylic polymer (which can be thermosetting or thermoplastic) in ammonia water, (b) a water-soluble blocked zirconium or zinc catalyst such as ammonium zirconium carbonate or zinc oxide, (c) an (non-toxic) organic solvent in mixture with water, and (d) a corrosion additive such as 2-mercapto benzothiazole ("MBT"), sodium 2-mercapto benzothiazole ("SMB"), 2-mercapto benzimidazole, sodium 2-mercapto benzimidazole, tolyltriazole or mixtures thereof. Also included may be defoamers, leveling agents, mold inhibitors, dyes and the like.

The invention also provides a method for applying the protective coating to the metal surface in which the surface is contacted with the foregoing formulation and, when the acrylic polymer is thermosetting, the polymer is preferably cured. The preferred method of application is dipping.

DETAILED DESCRIPTION OF THE INVENTION

It has now been found that good corrosion resistance can be obtained by use of a combination of solutions or dispersions of acrylic polymers in ammonia water; blocked water-soluble zirconium and/or zinc catalysts; non-toxic organic solvents in combination with water; and corrosion protection additives. The ammonia neutralizes the polymer resins and volatizes upon drying. The mixture of water and solvent enhances film formation. The zirconium and/or zinc catalysts promote adhesion of the film to the substrate and top coat. Corrosion resistance of the metal interface is enhanced by replacing chromate inhibitors with non-toxic additives such as MBT, SMB, 2-mercapto benzimidazole, sodium 2-mercapto benzimidazole, tolyltriazole, triethanolamine phosphate, and 2,2-methylenebis(4-methyl-6-t-butylphenol).

This invention is particularly useful for protecting non-ferrous metals such as aluminum, zinc, magnesium, copper, cadmium, nickel, and titanium, but can also provide enhanced rust-proofing and paint adhesion characteristics to steel substrates such as galvanized steel. Aluminum is the preferred non-ferrous metal and includes pure aluminum and alloys thereof, including extrusions, cast, wrought, and sintered alloys. A preferred alloy is a high copper containing aluminum alloy such as 2024T3 which contains about 4% by weight copper.

The acrylic polymers normally have a molecular weight of from about 200,000 to about 1,000,000 or more. The polymer generally comprises about 3-20% by weight of the formulation on a dry solids basis, normally about 5-15%. Acceptable results may be obtained, for example, with a predissolved ammonia water solution (containing about 10-15 parts of ammonia per hundred parts of polymer) of a thermosetting acrylic copolymer (25% solids) having a molecular weight of about 1,000,000 and a pH of about 7.8 which is available commercially from B. F. Goodrich as CARBOSET 531 and/or with a solution of a thermoplastic acrylic copolymer which is available commercially as a solid from B. F. Goodrich as CARBOSET 525 (molecular weight of about 260,000) and CARBOSET 526 (molecular weight of about 200,000). Solutions of Carboset 525 or 526 can be prepared, for example, by dissolving the solid copolymer in water that has been heated to 160 degrees Fahrenheit with ammonium hydroxide. After cooling to about 100 degrees the other additives may be added with agitation to prepare a mixture. Performance characteristics can be modified by using mixtures of the Carboset resins, by adding a hard acrylic oligomer such as S. C. Johnson & Son's JONCRYL 680 which has a molecular weight of about 4200, and so on. The overall formulation generally contains about 0.5 to 5.0% by weight of ammonium hydroxide, normally about 1-3%.

Blocked ionic cross-linking catalysts such as ammonium zirconium carbonate ("AZC"), an alkanolamine chelate of zirconium oxide, or zinc oxide are useful. For example, acceptable results may be obtained with an aqueous solution of AZC containing the equivalent of 20% zirconium oxide—it is available commercially as BACOTE 20, a product of Magnesium Elektron Inc., with an alcoholic solution of 45-50% 1-propanol and 55-50% of the alkanolamine chelate of zirconium oxide, which solution is available commercially from the Du Pont company as TYZOR 212, and with a 15% solution of zinc oxide in water and ammonia, which solution is available commercially as ZINPLEX 15, a product of Ultra Additives, Inc. The catalyst solution is used in relatively minor amounts such as from about 0.05-3.0%, normally about 0.1-1.5%.

Various organic solvents in combination with water can be used, such as propyl alcohol, isopropyl alcohol, glycol ethers such as diethylene glycol monoethyl ether ("DGME") and ethylene glycol monopropyl ether ("EGME"), n-methylpyrrolidone, and combinations thereof. Tap or deionized water can be used, preferably deionized. The solvents generally comprise about 0.1-5.0% of the formulation, more typically about 1.5-2.5%. The water generally comprises about 28-91% of the formulation, depending on the desired concentration of the finished formulation.

A preferred corrosion additive is comprised of MBT and tolyltriazole. The tolyltriazole may be present as a 35% solution in isopropanol—such a product is available commercially as COBRATEC TT35I. The corrosion additives are generally used in minor amounts such as about 0.1-5.0%, more typically about 1.0-3.0%.

Other additives such as defoamers, leveling agents, mold inhibitors, and dyes can be used. Polyoxyethylene glycols are especially useful since they function both as an effective defoamer and as a surface tension modifier to promote metal wetting and surface leveling. The polyoxyethylene glycol used in the examples is PLURONIC L61 from Wyandotte Chemical having an approximate molecular weight of 2,000. Normal octanol can also be used as a defoamer if the final odor is not objectionable. A mold inhibitor such as methyl parahydroxy benzoate (available commercially as METHYL PARASEPT, a product of Kalama Chemical), and/or ammonium benzoate can also be used, usually in minor amounts. Formulation pH ranges of about 7.5 to 10 are preferred in order to prevent premature destabilization. A tinting dye such as Brilliant Bond Blue A may also be added in minor amounts.

To minimize foam and form a colloidal dispersion of the corrosion additives, it is preferred to predissolve these compounds into the solvent phase first, and then add dropwise to the acrylic solution.

Concentrates may be prepared by simply leaving out most of the water.

Application of the coating can be by spraying, flow coating, or dipping.

Examples of such formulations are as follows (all percentages are by weight):

| Ingredient | % |
| --- | --- |
| 1. Thermoplastic Coating for 2024T3 Aluminum (pH = 9.1): | |
| Carboset 525 solid | 9.0 |
| Deionized Water | 84.51 |
| Bacote 20 | 0.7 |
| Ammonium Hydroxide | 1.6 |
| MBT | 0.5 |
| Normal Propanol | 2.0 |
| Cobratec TT35I | 1.4 |
| Methyl Parasept | 0.02 |
| Pluronic L61 | 0.02 |
| Ammonium Benzoate | 0.25 |
| 2. Thermoplastic Coating for Galv. Steel (pH = 9.35): | |
| Carboset 525 solid | 8.0 |
| Deionized water | 85.21 |
| Zinplex 15 | 1.0 |
| Ammonium Hydroxide | 1.6 |
| MBT | 0.5 |
| Normal Propanol | 2.0 |
| Cobratec TT35I | 1.4 |
| Methyl Parasept | 0.02 |
| Pluronic L61 | 0.02 |
| Ammonium Benzoate | 0.25 |
| 3. Thermosetting Coating for 2024T3 Aluminum (pH = 9.2): | |
| Carboset 531 solution (25% solids) | 28.0 |
| Deionized water | 65.41 |
| Bacote 20 | 0.7 |
| Ammonium Hydroxide | 1.4 |
| MBT | 0.5 |
| Normal Propanol | 2.0 |
| Cobratec TT35I | 1.4 |
| Methyl Parasept | 0.02 |
| Brilliant Bond Blue A Tinting Dye | 0.3 |
| Pluronic L61 | 0.02 |
| Ammonium Benzoate | 0.25 |

Test data indicates that the example 1-3 formulations provide metal panels with protective films which pass the 168-hour salt spray resistance test (ASTM-B-117-73).

The film-protected panels can be provided with top coats by well-known conventional methods to meet their intended end uses.

What is claimed is:

1. A formulation for coating the surface of a metal comprising (a) a solution of a thermoplastic or thermosetting acrylic polymer in ammonia water wherein the polymer comprises about 3-20% by weight of the formulation on a dry basis, (b) about 0.05-3.0% of a water-soluble, blocked zirconium or zinc catalyst selected from ammonium zirconium carbonate, an alkanolamine chelate of zirconium oxide, or zinc oxide, (c) a mixture of water and an organic solvent, the solvent comprising about 0.1-5.0% of the formulation, and (d) about 0.1-5.0% of a corrosion additive.

2. A formulation according to claim 1 wherein the metal is aluminum.

3. A formulation according to claim 1 wherein the metal is galvanized steel.

4. A formulation according to claim 1 wherein the acrylic polymer is thermosetting.

5. A formulation according to claim 1 wherein the acrylic polymer is thermoplastic.

* * * * *